UNITED STATES PATENT OFFICE.

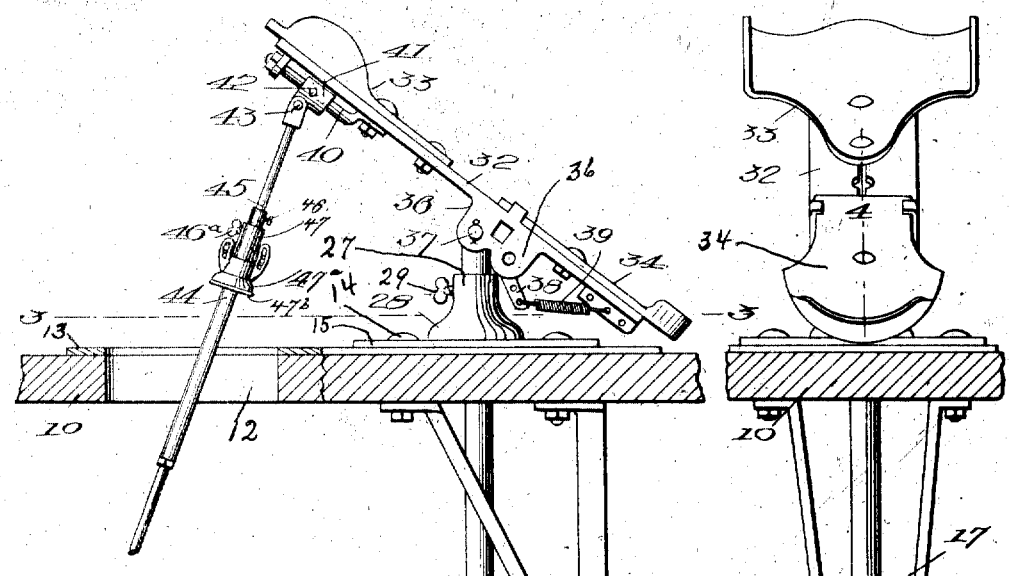

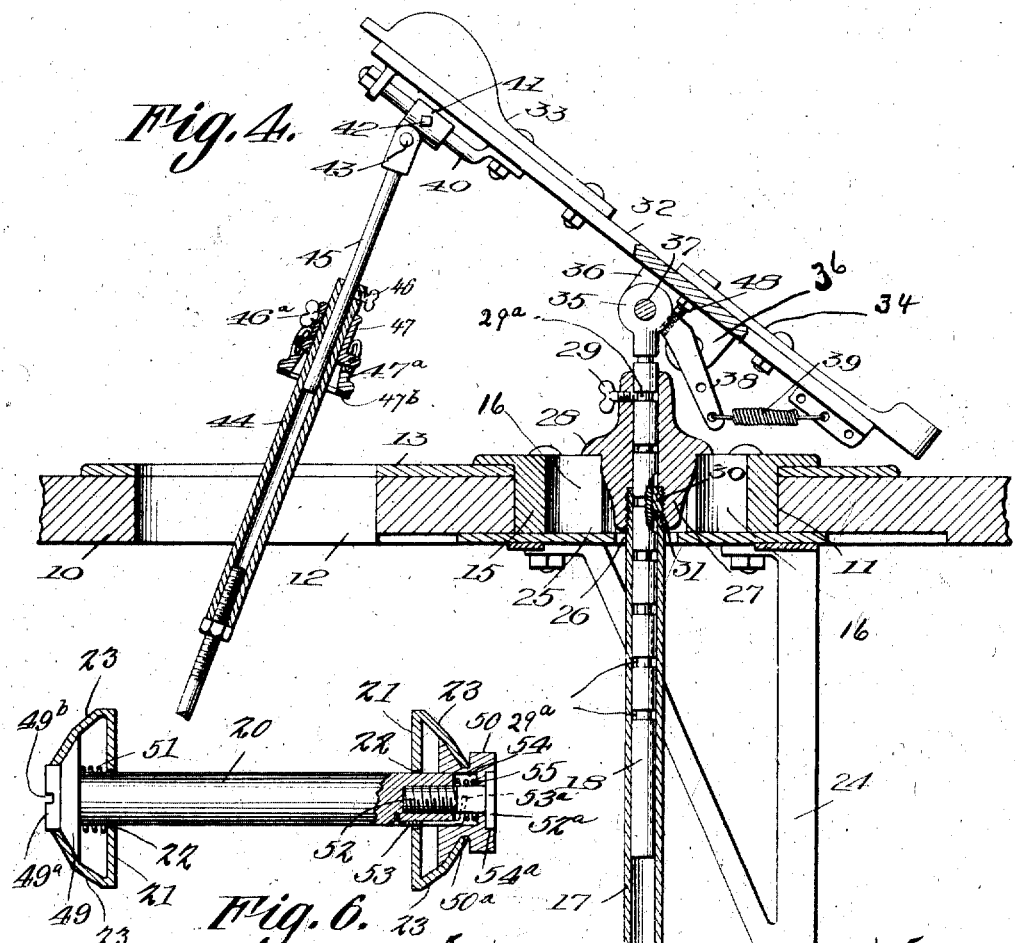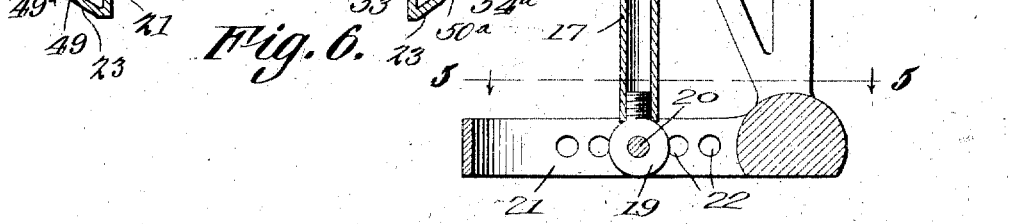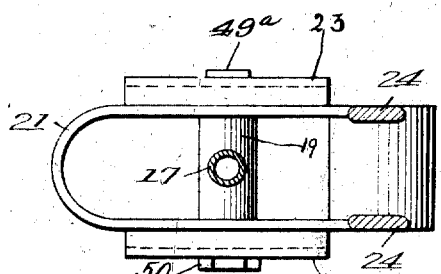

TORVAL J. ANDERSON, OF ROCKDALE, WISCONSIN.

COMBINED ACCELERATOR AND FOOT-REST.

1,248,592.  Specification of Letters Patent.  Patented Dec. 4, 1917.

Application filed February 19, 1917. Serial No. 149,515.

*To all whom it may concern:*

Be it known that I, TORVAL J. ANDERSON, citizen of the United States, residing at Rockdale, in the county of Dane and State of Wisconsin, have invented new and useful Improvements in Combined Accelerators and Foot-Rests, of which the following is a specification.

This invention relates to devices for controlling the speed of automobiles and other motor vehicles which are driven by an internal-combustion engine, and more particularly to the part known as the accelerator pedal which is connected to the throttle for actuating the same to control the fuel supply to the engine and thus regulate the speed of the latter.

The invention has for its object to provide an accelerator which can also be used as a foot rest without danger of actuating the throttle, and also to provide a structure having a wide range of adjustability.

A further object of the invention is to provide an accelerator which can be set to a predetermined maximum throttle opening, thereby preventing new and inexperienced drivers from making excessive speeds, and racing the engine when starting or stopping.

The objects stated are attained by means of a novel combination and arrangement of parts to be hereinafter described and claimed, and in order that the same may be better understood, reference is had to the accompanying drawings forming a part of this specification.

In the drawings,

Figure 1 is a side elevation of the device;

Fig. 2 is a front elevation thereof;

Fig. 3 is a horizontal section on the line 3—3 of Fig. 1;

Fig. 4 is an enlarged vertical section on the line 4—4 of Fig. 2;

Fig. 5 is a horizontal section on the line 5—5 of Fig. 4, and

Fig. 6 is a sectional detail of a pivot bolt.

Referring specifically to the drawings, 10 denotes the floor of the car adjacent to the driver's seat. In this portion of the floor are made openings 11 and 12, and on top of the floor is fixed a metal plate 13 having openings which register with the floor openings.

In the floor opening 11 and the corresponding opening of the floor plate 13 is mounted and secured by bolts 14, a bearing block 15, having a series of openings 16 located different distances from its center. This bearing block is designed to support the intermediate portion of a stem carrying the accelerator pedal. This stem is longitudinally adjustable, it being composed of two telescopically connected sections 17 and 18, the former being tubular to receive the latter.

To the lower end of the tubular stem 17 is fitted a hinge knuckle 19 through which passes a pivot bolt 20 carried by a horizontal yoke 21. The knuckle seats between the yoke branches and is adjustable in the direction of the length of the yoke so that the accelerator pedal may be set forward or rearward with respect to the driver's seat. The yoke branches have a series of apertures 22 for the bolt 20 to permit this adjustment to be made. On the outer faces of the yoke branches are retaining flanges 23 for the head and the fastening nut of the bolt. The yoke is at the bottom of a bracket 24 secured to the bottom of the car floor 10 and depending therefrom.

The opening in the block 15 is covered at the bottom by a slide 25 having an aperture 26 through which the stem 17 passes.

On the upper end of the stem is screwed a collar 27 which is shaped to fit in any one of the openings 16, and has a shoulder 28 engaging the top of the block 15. The rod 17 may be swung about the pivot bolt 20, forward or rearward, to enable the collar 27 to be placed in any one of the openings 16. Fig. 3 shows the collar in the center opening. If the accelerator pedal is to be adjusted forward or rearward, the collar is unscrewed until it is free of the center opening, and it is then moved forward or rearward to the next opening and screwed down into the same. By giving the block 15 a quarter turn, the other openings are brought in line with the collar. The rod 17 therefore has a wide range of adjustment, the same being effected by swinging the same forward or rearward as just described, and also by bodily moving the rod forward or rearward, the latter adjustment being effected by changing the location of the pivot bolt 20 as hereinbefore described.

The stem 18 extends through the collar 27 and rises a suitable distance from the top thereof, it being locked in the tubular stem 17 by a set screw 29 threaded through the collar. The stem 18 has annular grooves 29ª receiving the inner end of the set screw.

The upper end of the stem 17 has an internal lug 30 seating in a longitudinal groove 31 in the stem 18, whereby the latter is held against turning in the stem 17.

The accelerator pedal is indicated at 32 it being mounted on the upper end of the stem 18, above the floor 10. The pedal has adjustable toe and heel portions 33 and 34, respectively, the former having side flanges and the latter having a rear marginal heel-engaging flange, to prevent the driver's foot from slipping off the pedal. The toe and heel extension may also be provided with rubber pads.

On the upper end of the stem 18 is a hinge knuckle 35 which seats between two laterally spaced ears 36 extending from the bottom of the pedal 32, with a pivot pin 37 passing through said parts to provide a pivotal connection between the pedal 32 and the stem 18. Two sets of ears 36 are provided so that the fulcrum point or pivot of the pedal may be shifted closer to or farther from the heel of the pedal.

From the knuckle 35 extends an arm 38 to which is connected one end of a coiled spring 39 having its other end connected to the bottom of the pedal 32 at the heel portion thereof.

On the bottom of the toe portion of the pedal is mounted a rod 40 extending longitudinally and supporting a sleeve 41, the latter being adjustable along the rod and held fixed thereon in adjusted position by a set screw 42. To this sleeve is pivotally connected, as indicated at 43, a rod which is composed of two adjustably connected sections 44 and 45, held locked in adjusted position by a set screw 46. This rod is connected to the throttle, and the latter is therefore operated by the pedal 32, the throttle being opened when the toe portion of the pedal is depressed. In order to prevent the throttle from being opened too far, the rod section 44 carries an adjustable stop collar 47 located above the floor 10 to stop the pedal when said collar strikes the floor plate 13. The rod 44 passes through the floor opening 12 and through the corresponding opening in the floor plate.

When the pedal 32 is depressed to open the throttle, the spring 39 is stretched, so that when the downward pressure on the pedal is released, said spring swings the pedal upward and places it again in its normal position. In this position, the pedal is down at its heel end and up at its toe end, and it is held in this position by the spring, and the pedal may now be used as a foot rest without danger of operating the throttle, as a positive downward pressure at the toe end of the pedal against the tension of the spring is required before the pedal will tilt to open the throttle. The driver can therefore rest the foot on the pedal without danger of the foot being jarred on rough roads to operate the pedal and disturb the throttle adjustment. The collar 47 prevents the throttle from being opened too far and limits the speed at which the car may be run, so that there is no danger of an inexperienced driver running the car at an excessive speed, or racing the engine when starting or stopping. The arm 38 carries an adjustable stop 48 to limit the downward swing of the heel end of the pedal 32, said stop being located beneath the pedal so that the latter strikes the same when it is pulled back by the spring 39. The stop may be a set screw as shown.

The stop collar 47 is fixed on the rod section 44 by a set screw 46ª. As the rod sections 44 and 45 may be set to extend at different angles with respect to the floor plate 13, the stop collar has a section 47ª which is adjustable so that it may squarely engage the floor plate 13 in the various positions of the rod sections. The connection between the stop collar sections is made by a pin and slot as shown in Figs. 1 and 4. The bottom of the collar section 47ª has a rubber cushion 47ᵇ.

One end of the bolt 20 has a head 49 which seats under the flanges 23 on one side of the yoke 21, and on the other end of the bolt is mounted a nut 50 which is so constructed that it is held against turning by the flanges 23 on the corresponding side of the yoke. As shown in Fig. 6, the nut seats partly beneath the flanges 23 and has a reduced portion 50ª which is square in cross-section and fits between the flanges, whereby the nut is prevented from turning. The head 49 of the bolt has at its outer end a reduced squared portion 49ª which fits between the flanges 23 and prevents the bolt from turning. The bolt head is spaced a sufficient distance from the side of the yoke so that the bolt may be moved inward toward said side, against the tension of a spring 51 coiled around the shank of the bolt between the side of the yoke and the base or inner side of the bolt head. The outer end of the reduced portion 49ª of the bolt head has a nick 49ᵇ for the application of a screwdriver to facilitate the turning of the bolt.

That end of the bolt 20 which carries the nut 50 has an axial bore which is screw threaded to receive a threaded stem 52 projecting from this end of the bolt and having at its outer end a transverse or T-shaped head 52ª. The stem is adjustable in the direction of its length so that the T-head thereof may project more or less from the end of the bolt, and it is held in adjusted position by a flat spring 53 fixed in a notch in the side of the bolt and having at its free end a laterally projecting portion which is forked, as shown at 53ª, to straddle the shank 52 immediately back of the T-head, this portion of the shank being squared. Thus it will be seen that the spring prevents rotation of the shank 52, and upon flexing the spring outward to disengage the same from the shank, the latter may be turned to space its T-head a proper distance from the end of the bolt shank.

The nut 50 has a recess 54 extending inward from its base and continued through the outer end, said recess being dimensioned to receive the T-head 52ª, and the outer face of the nut having a cross slot 54ª in which the T-head is adapted to seat. The recess 54 also houses a coiled spring 55 against which the end of the bolt shank 20 is adapted to seat.

To disengage the bolt 20 from the nut 50, the bolt is pushed inward against the tension of the spring 51 until the T-head 52ª is clear of the cross slot 54ª, after which the bolt is turned to bring the T-head in line with the recess 54. A reversal of this operation couples the nut to the bolt. The bolt head 49 is elongated, its longer dimensions being such that it fits under the flanges 23, and its shorter dimensions being such that it may pass between the flanges in order that the bolt may be withdrawn. The nut cannot be withdrawn from the flanges 23, but is placed in position by being slipped under the flanges from one end thereof.

I claim—

1. The combination of an accelerator pedal for motor vehicles, a support to which the pedal is pivoted intermediate its ends, a throttle connection attached to the toe end of the pedal, a spring connection between the support and the heel end of the pedal, and a stop on the support positioned to be engaged by the heel end of the pedal.

2. The combination of an accelerator pedal for motor vehicles, a support to which the pedal is pivoted intermediate its ends, a throttle connection attached to the toe end of the pedal, a spring connection between the support and the heel end of the pedal, and an adjustable stop on the throttle connection for limiting the downward swing of the toe end of the pedal.

3. The combination of an accelerator pedal for motor vehicles, a support to which the pedal is pivoted intermediate its ends, a throttle connection attached to the toe end of the pedal, said attachment being adjustable in the direction of the length of the pedal, and a spring connection between the support and the heel end of the pedal.

4. The combination of an accelerator pedal for motor vehicles, a support to which the pedal is pivoted intermediate its ends, a throttle connection attached to the toe end of the pedal, said connection having longitudinally adjustable sections, and a spring connection between the support and the heel end of the pedal.

5. The combination of an accelerator pedal for motor vehicles, a stem to which the pedal is connected, said stem being composed of longitudinally adjustable sections, a support for the stem, and a throttle connection attached to the pedal, said connection having longitudinally adjustable sections.

6. The combination of an accelerator pedal for motor vehicles, a stem to which the pedal is pivoted, a throttle connection attached to the pedal, a support to which the stem is pivoted at its lower end, and an adjustable holding means for the intermediate portion of the stem.

7. The combination of an accelerator pedal for motor vehicles, a stem to which the pedal is pivoted, a throttle connection attached to the pedal, a support to which the stem is pivoted at its lower end, and an adjustable holding means for the intermediate portion of the stem, said holding means comprising a collar carried by the stem, and an apertured member to receive and hold the collar.

8. The combination of an accelerator pedal for motor vehicles, a stem to which the pedal is pivoted, a throttle connection attached to the pedal, a horizontal support to which the lower end of the stem is attached adjustably in the direction of the length thereof, and an adjustable holding means for the intermediate portion of the stem.

In testimony whereof I affix my signature.

TORVAL J. ANDERSON.